Oct. 9, 1934.　　　　M. O. TEETOR　　　　1,976,587

STALL INDICATOR FOR AIRPLANES

Filed Nov. 21, 1929　　　2 Sheets-Sheet 1

Inventor:
Macy O. Teetor,
By Rector, Hibben, Davis & Macauley
Atty

Oct. 9, 1934.    M. O. TEETOR    1,976,587
STALL INDICATOR FOR AIRPLANES
Filed Nov. 21, 1929    2 Sheets-Sheet 2
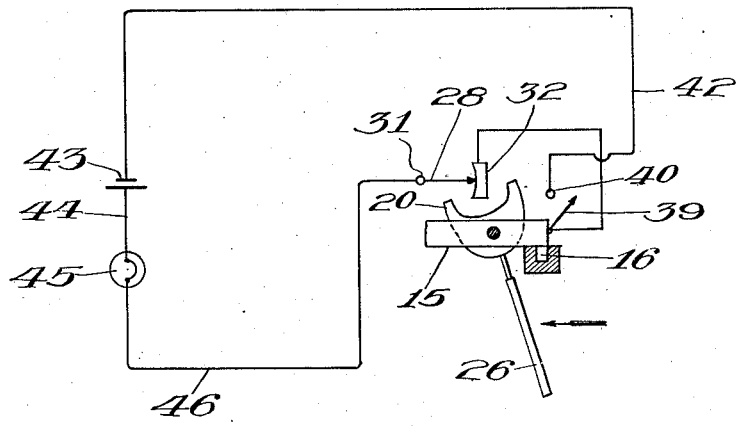
*Fig. 7.*
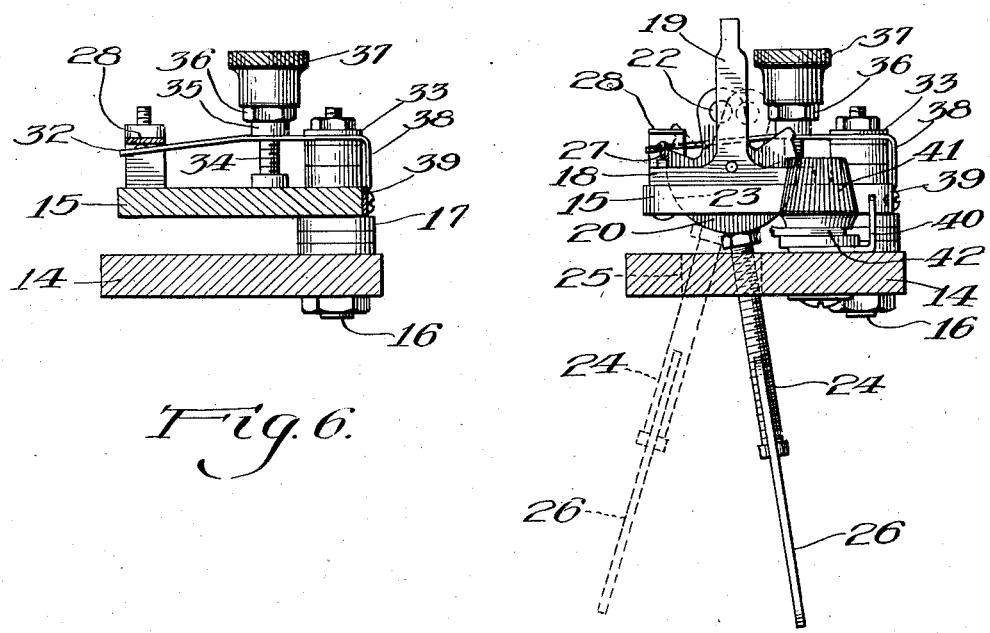
*Fig. 6.*   *Fig. 5.*
Inventor:
Macy O. Teetor,
By Keeton, Hibben, Davis & Macauley
Attys

Patented Oct. 9, 1934

1,976,587

UNITED STATES PATENT OFFICE 1,976,587

STALL INDICATOR FOR AIRPLANES

Macy O. Teetor, Hagerstown, Ind., assignor of one-half to Charles E. Cox, Jr., Indianapolis, Ind.

Application November 21, 1929, Serial No. 408,724

13 Claims. (Cl. 177—311.5)

My invention relates to stall indicators for airplanes.

The principal object of my invention is to devise for airplanes an appliance embodying a warning signal which shall indicate to the pilot a loss of flying speed over a predetermined range with a view of preventing loss of control of the ship by reason of such decreased speed.

A further object is to devise an indicator of the type described which is characterized by simplicity in construction, a sureness of operation under flying conditions, and easy applicability to convenient locations on a plane.

In the operation of airplanes, a loss of flying speed, whether by reason of attempting a steep climb with insufficient power, or a late effort to nose the ship over near the completion of a climb, or the stalling of a ship in a glide with the power shut off, frequently results in a loss of control over the plane and a falling of the latter into a tail spin. It is the express object of the present invention to provide an arrangement which will indicate to any of the selected senses of the pilot that the speed of the ship is dangerously decreasing, so that prompt steps can be taken to correct the condition. The device is preferably located on the ship where it will be subjected to the action of a free air stream and includes a warning signal whose operation is controlled by the dynamic pressure of the air, the mechanism being calibrated to give the necessary indication over a range of flying speed whose numerical extent will depend upon the characteristics of the individual ship. The warning signal may be of any approved type and may include audible signals, such as bells, whistles, and sirens, visual signals such as a light on the instrument board, or what might be termed a feeling signal in that it may be designed to arouse the pilot by actually contacting with him, such as a bar or prodding device in general. The term "warning signal" where used in the claims, is deemed to be inclusive of the above or other types.

These and further objects of my invention will be set forth in the following specification, reference being had to the accompanying drawings and the novel means by which said objects are effectuated will be definitely pointed out in the claims.

Figures 3, 4:
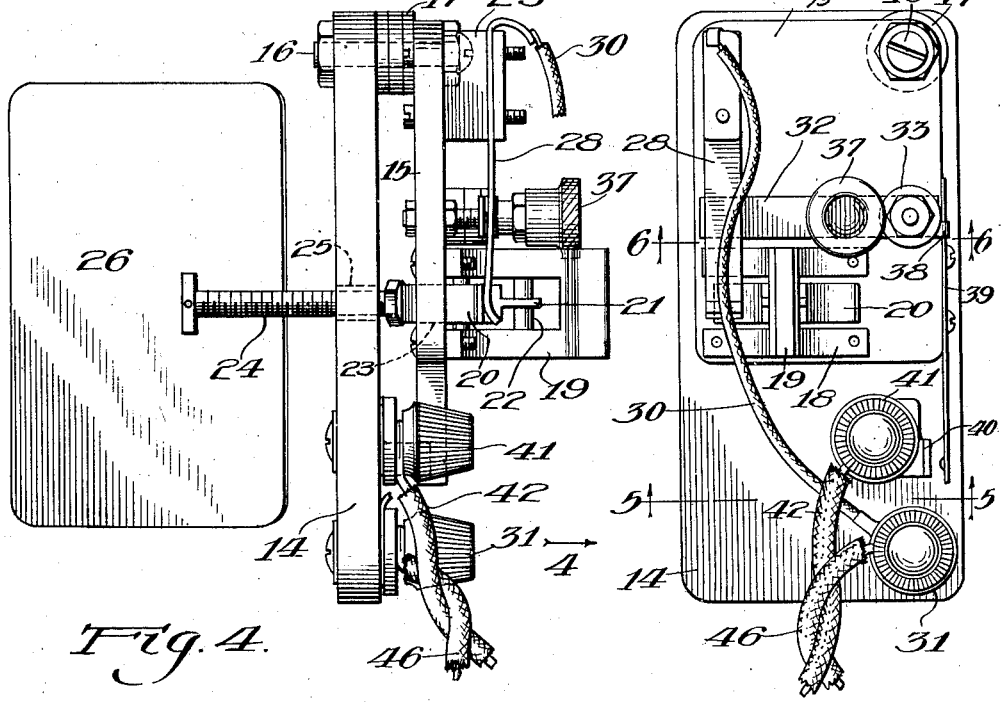
Fig. 3 is an elevation of the inner face of the indicator cover plate.
Fig. 4 is a side view of the cover plate looking in the direction of the arrow 4 in Fig. 3.

Figs. 5 and 6 are sections along the lines 5—5 and 6—6, respectively, in Fig. 3, looking in the direction of the arrows.

Fig. 7 is a diagram of the electrical connections utilized in connection with the indicator.

Figures 1, 2:
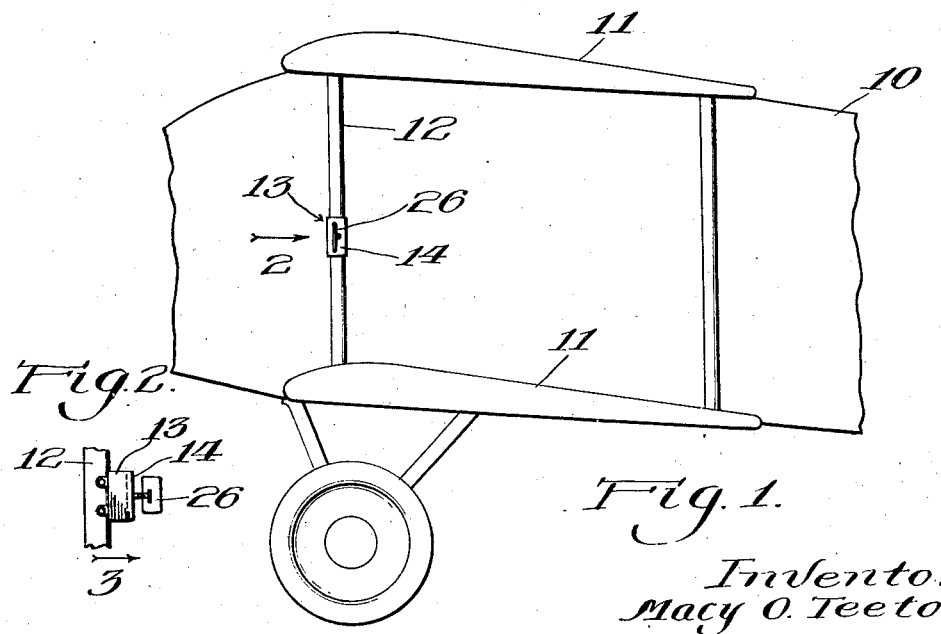
Figure 1 is a diagrammatic side elevation of a portion of an airplane showing my improved indicator in position thereon.
Fig. 2 is a view of the indicator looking in direction of the arrow 2 in Fig. 1.

The stall indicator consists of a casing 13 which, in the arrangement shown in Fig. 1, is attached directly to and vertically on one of the struts 12, although it may be secured in other locations on the plane, such as on a stay wire, selected portions of the wing surfaces, or in other suitable positions. The casing 13 is provided with a cover plate 14 which is preferably formed of insulating material and to which is attached the major portion of the operating mechanism of the indicator.

This mechanism is attached to the inner face of the plate 14 and consists of a rectangular block 15, also preferably formed of insulating material, and which is pivotally secured at an upper corner thereof to the plate 14 by means of a pin 16, the block being spaced from the plate by washers 17. This construction enables the block 15 to be swung in a plane parallel to the plane of the plate 14, which operation is effected in a manner hereinafter described. At a diagonally opposite and lower corner of the block 15, a support 18 consisting of a pair of spaced arms 19 is secured thereto and projects outwardly therefrom. A parti-circular cam 20 is pivotally mounted on the support 18 between the arms 19 and is provided with a centrally disposed finger 21 projecting therefrom between the arms 19 and from which extend in opposite directions guide portions 22 which bear against the inner and facing surfaces of the arms 19. The opposite side of the cam 20 extends through a slot 23 provided in the block 15 and has secured thereto one end of a stem 24. This stem extends freely through an elongated slot 25 provided in the cover plate 14 and has secured to its outer end a vane 26 of appropriate size and suitable profile.

The cam 20 is provided with a nose 27 which contacts with the underside of the free end of a strip contact 28, preferably formed of a springy metallic material, the opposite end of said contact being secured to a terminal block 29 which is mounted on the swingable block 15. The contact 28 is electrically connected by means of a wire 30 with a terminal 31 provided on the cover plate 14, as shown clearly in Fig. 3. Intermediate of the free and fixed ends of the contact strip 28, a second contact strip 32 is disposed so as to engage by means of its free end with the underside of the strip 28 at predetermined times. The strip 32 is also formed of a springy metallic material, but preferably having a less thickness than the strip contact 28 for a purpose hereinafter explained, and the fixed end of the contact strip 32 is secured to a binding post 33 which is mounted on the block 15. In order to provide a means of adjusting the position of the strip 32 independently of the securement of the end thereof to the binding post 33, a threaded pin 34 is fixed in the block 15 between the free and fixed ends of the strip 32 and extends upwardly through a suitable perforation provided in said strip. On the outer side of said strip, as viewed in Figs. 4 and 6, a washer 35 encircles the pin 34 for engagement with said strip and is maintained in position by means of adjusting and lock nuts 36 and 37, respectively. This arrangement provides a means of initially determining the position of the free end of the strip 32 and also of controlling its range of movement.

The strip contact 32 is provided with a tongue 38 which is bent over one of the vertical edges of the block 15 for electrical connection with one end of a strip contact 39 which is secured along said vertical edge. The contact 39 projects downwardly below the lower edge of the block 15 to provide a free end which, when the plane is not flying, is spaced from the contact 40 on the terminal 41 which is located on the cover plate 14, as shown in Fig. 3. The terminal 41 is electrically connected by means of a lead 42 with a source of electrical energy, denoted generally by the battery 43, the latter in turn being electrically connected by means of a lead 44 with a lamp 45, which is preferably located on the instrument board of the plane, said lamp being generally representative of warning signals of all types. The lamp 45 is electrically connected by means of a lead 46 with the terminal 31.

The figures in the drawings illustrate the parts above described in their individual and relative positions while the plane is on the ground. Since the casing 13 is so located as to place the block 15 in a vertical position, considered generally, it will be apparent that since said block is pivotally secured to the plate 14 at only one corner of the former, that said block will be biased under its own weight and the weight of the parts carried thereby to normally maintain a separated condition of the strip contact 39 and terminal contact 40, thereby breaking the electrical circuit at this point and preventing an operation of the warning signal when the plane is not flying. This breaking of the circuit is automatically attained by gravity action as soon as the plane has come to a full stop, or even prior thereto when the flying speed has decreased below the danger zone of flying speed as hereinafter explained. In the same still position of the plane, the relative positions of the strip contacts 28 and 32 are generally indicated in Fig. 4, the former contacting with and moving the latter toward the block 15, owing to its stronger spring action by reason of its greater thickness, and the free end of the contact strip 28 being in engagement with the nose 27 on the cam 20.

As the plane leaves the ground and its flying speed gradually increases, the dynamic pressure of the air against the vane 26 also increases, with the result that said vane is moved toward the right, as shown in Fig. 1, or from the full to the dotted line position shown in Fig. 5. This movement of the vane 26 swings the block 15 bodily toward the left, as shown in Fig. 3, owing to its pivotal connection with the cover plate 14, which movement ultimately completes the electrical circuit through the free end of the strip 39 and contact 40, whereupon the lamp 45 will be illuminated. This illumination of the lamp 45 marks the lower limit of the dangerous range of flying speed. The same movement of the vane 26 under the pressure of the air also initiates a rotatory movement of the cam 20 to cause a gradual lifting of the free end of the contact 28 away from the block 15. Electrical connection between the strips 28 and 32, however, is not immediately broken, for the latter strip was originally depressed by the strip 28 in the initial position of the latter. Accordingly, the free end of the strip 32 will follow for a predetermined period the strip 28 in its lifting movement under the actuation of the cam 20 until the strip 32 reaches its maximum position in this following direction as determined by the adjustment effected by the nut 36 which is mounted on the stem 34. Further movement of the strip 28 will, therefore, break the electrical connection with the strip 32, whereupon the lamp 45 will be extinguished. This point of extinguishment marks the other, or higher, limit of the range of dangerous flying speed. Under extremely high speeds, it is possible that the pressure on the vane 26 may become so excessive that the stem 24 may actually fulcrum on the adjacent end wall of the slot 25 to cause an actual movement of the block 15 toward the right, as shown in Fig. 3, with a resulting breaking of the electrical connection between the contacts 40 and 39. This possible operation, however, does not affect the subsequent operation of the mechanism as will now be described. For that reason, it will be considered that the strip 39 and contact 40 are in actual engagement, and that the breaking of the electrical circuit is effected between the strip contacts 28 and 32, as above described.

So long as the speed of the plane is maintained above the speed which marks the higher limit of the zone of dangerous flying speed, as determined by the separation of the contacts 28 and 32, the indicator remains inoperative. If the speed of the plane does fall, however, the dynamic pressure of the air against the vane 26 will likewise be decreased, so that the latter will begin to move from the position shown dotted in Fig. 5 toward its full line position, also shown in said figure. The ensuing operation of the indicator mechanism will thereafter be exactly the reverse of that described above. The electrical circuit will first be completed between the contacts 28 and 32, whereupon the lamp 45 will be illuminated, and the circuit will be maintained until the pressure of the air against the vane 26 has decreased to such a point that the gravity action on the block 15 will cause a swinging of the latter toward the right, as shown in Fig. 3, to break the circuit between the strip contact 39 and terminal contact 40.

The construction of the indicator and its calibration to effect an operation of the warning signal over a definite range of flying speed positively insures a conveyance of the warning to the pilot of the ship's condition, which type of operation is manifestly superior to an indicator which would only momentarily flash a warning at some single flying speed. Flying characteristics of airplanes differ, but the construction of the indicator is such that it may be easily adjusted to compensate therefor.

While I have shown one set of elements and combinations thereof for effectuating my improved stall indicator, it will be understood that the same is intended for purpose of illustration only and in no wise to restrict my device to the exact forms and structures shown, for many changes may be made therein without departing from the spirit of my invention.

I claim:

1. In a stall indicator for airplanes, an electrical circuit comprising a source of electrical energy, a warning signal and switch mechanism, said mechanism consisting of a base plate including a slot, a pair of electrical terminals attached thereto, a block swingably mounted on said plate and biased to an initial position, a contact strip on said block standing free of one of said terminals in the initial position of said block, a second contact strip on said block connected to the other of said terminals and electrically connected to said first named contact strip in the initial position of said block, a cam pivoted on said block for engagement with said second strip and having a rod extending freely through said slot, and a vane actuable by air pressure secured to the outer end of said rod, the initial movement of said vane bodily moving said block to close the circuit through said first strip and its coacting terminal, and a subsequent movement of said vane actuating said cam to move said second strip away from the electrical connection with said first strip, the reverse movement of said vane effecting a reversal of the operation of said strips.

2. In a stall indicator for airplanes, an electrical circuit comprising a source of electrical energy, a warning signal and switch mechanism, said mechanism consisting of a base plate including a slot, a pair of electrical terminals attached thereto, a block swingably mounted on said plate and biased by gravity to an initial position, a contact strip on said block standing free of one of said terminals in the initial position of said block, a second contact strip on said block connected to the other of said terminals and electrically connected to said first named contact strip in the initial position of said block, a cam pivoted on said block for engagement with said second strip and having a rod extending freely through said slot, and a vane actuable by air pressure secured to the outer end of said rod, the initial movement of said vane bodily moving said block to close the circuit through said first strip and its coacting terminal, and a subsequent movement of said vane actuating said cam to move said second strip away from electrical connection with said first strip, the reverse movement of said vane effecting a reversal of the operation of said strips.

3. In a stall indicator for airplanes, an electrical circuit comprising a source of electrical energy, a warning signal and switch mechanism, said mechanism consisting of a base plate including a slot, a pair of electrical terminals attached thereto having electrical connection with said source and signal, a swingable block pivoted at one corner thereof on said plate and biased to an initial position under the action of gravity, a contact strip on said block standing free of one of said terminals in the initial position of said block, a second contact strip on said block connected to the other of said terminals and electrically connected to said first named contact strip in the initial position of said block, a cam pivoted on said block for engagement with said second strip and having a rod extending freely through said slot, and a vane actuable by air pressure secured to the outer end of said rod, the initial movement of said vane bodily moving said block to close the circuit through said first strip and its coacting terminal, and a subsequent movement of said vane actuating said cam to move said second strip away from electrical connection with said first strip, the reverse movement of said vane effecting a reversal of the operation of said strips.

4. In a stall indicator for airplanes, an electrical circuit comprising a source of electrical energy, a warning signal and switch mechanism, said mechanism consisting of a base plate including a slot, a pair of electrical terminals attached thereto, a block swingably mounted on said plate and biased to an initial position, a contact strip on said block standing free of one of said terminals in the initial position of said block, a second contact strip on said block connected to the other of said terminals, a spring contact strip electrically connecting said first and second contact strips in the initial position of said block, a cam pivoted on said block for engagement with said second strip and having a rod extending freely through said slot, and a vane actuable by air pressure secured to the outer end of said rod, the initial movement of said vane bodily moving said block to close the circuit through said first strip and its coacting terminal and a subsequent movement of said vane actuating said cam to move said second strip away from contact with said spring contact strip, said spring contact strip maintaining its engagement with said second strip over a predetermined range of movement, whereby the electrical circuit is completed for a predetermined, appreciable time, corresponding to the range of flying speed, the reverse movement of said vane effecting a reversal of the operation of all of said strips.

5. In a stall indicator for airplanes, the combination of a warning signal, a first switch, a second switch electrically connected thereto, said switches occupying open and closed circuit positions, respectively, below a predetermined flying speed, a vane, means actuable by air pressure on said vane to close said first switch at a pressure corresponding to a flying speed above said predetermined speed and movable at a higher air pressure to open the second switch, the pressures intervening between the closing and opening of said switches, respectively, corresponding to a predetermined range of flying speed, and electrical connections between the signal and switches to operate the signal when both switches are closed.

6. In a stall indicator for airplanes, the combination of a warning signal, a first switch, a second switch electrically connected thereto, said switches occupying open and closed circuit positions, respectively, below a predetermined flying speed, a vane, means actuable by air pressure on said vane adapted to successively close said first switch at a pressure corresponding to a flying speed above said predetermined speed and to open the second switch at an air pressure higher than the air pressure closing said first switch, the pressures intervening between the closing and opening of said switches, respectively, corresponding to a predetermined range of flying speed, and electrical connections between the signal and switches to operate the signal when both switches are closed.

7. In a stall indicator for airplanes, the combination of a warning signal, a first switch, a second switch electrically connected thereto, said switches occupying closed and open circuit positions, respectively, above a predetermined flying speed, a vane, means actuable by air pressure on said vane and movable at a pressure corresponding to a flying speed less than said predetermined speed to close said second switch and further movable upon the occurrence of a predetermined lower speed to open the first switch, the pressures intervening between the closing of the second switch and the opening of the first switch corresponding to a predetermined range of flying speed, and electrical connections between the signal and switches to operate the signal when both switches are closed.

8. In a stall indicator for airplanes, the combination of a warning signal, a first switch, a second switch electrically connected thereto, said switches occupying closed and open circuit positions, respectively above a predetermined flying speed, a vane, means actuable by air pressure on said vane adapted to successively close said second switch at a pressure corresponding to a flying speed below said predetermined speed and to open the first switch at an air pressure less than the pressure closing the second switch, the pressures intervening between the closing of the second switch and the opening of the first switch corresponding to a predetermined range of flying speed, and electrical connections between the signal and switches to operate the signal when both switches are closed.

9. In a stall indicator for airplanes, the combination of a warning signal, a first switch, a vane, means actuable by air pressure on said vane adapted to bodily move said switch to circuit closing position and to thereafter move further under increasing air pressure, a second switch electrically connected to said first switch and opened by the further movement of said vane, the reverse movement of the vane effecting a reversed operation of the switches, and electrical connections between the signal and switches to operate the signal when both switches are closed.

10. In a stall indicator for airplanes, the combination of a warning signal, a first switch, a vane, means actuable by air pressure on said vane adapted to bodily move said switch to circuit closing position and to thereafter move further under increasing air pressure, a second switch electrically connected to said first switch and opened by the further movement of said vane, said second switch comprising two members arranged to maintain contact with each other during a predetermined portion of said further movement, the pressures intervening between the closing and opening of said switches, respectively, corresponding to a predetermined range of flying speed and the reverse movement of the vane effecting a reversed operation of said switches, and electrical connections between said signal and switches to operate the signal when both switches are closed.

11. In a stall indicator for airplanes, the combination of a warning signal, a first switch biased to an open circuit position below a predetermined flying speed, a vane, means actuable by air pressure on said vane adapted to bodily move said switch to circuit closing position at a pressure higher than the pressure corresponding to said predetermined speed and to thereafter move further under increasing air pressure, a second switch electrically connected to said first switch and opened by the further movement of said vane at a pressure in excess of the pressure closing said first switch, the pressures intervening between the closing and opening of said switches, respectively, corresponding to a predetermined range of flying speed and the reverse movement of said vane effecting a reversal of the operations of the switches, and electrical connections between the signal and switches to operate the signal when both switches are closed.

12. In a stall indicator for airplanes, the combination of a warning signal, switch mechanism comprising a base plate, a pair of electrical terminals attached thereto, a block swingably mounted on said plate and biased to an initial position, a contact strip on said block standing free of one of said terminals in the initial position of said block, a second contact strip on said block connected to the other of said terminals and electrically connected to said first named contact strip in the initial position of said block, a vane, means actuable by air pressure on said vane adapted by initial movement to bodily move said block and contact said first strip with its coacting terminal, means actuated upon subsequent movement of the first named means to move said second strip away from electrical connection with said first strip, the reverse movement of said vane effecting a reversal of the operation of said strips, and electrical connections between the signal and switch mechanism to operate the signal when both contact strips are closed.

13. In a stall indicator for airplanes, the combination of a warning signal, switch mechanism comprising a base plate, a pair of electrical terminals attached thereto, a block swingably mounted on said base and biased to an initial position, a contact strip on said block standing free of one of said terminals in the initial position of said block, a second contact strip on said block connected to the other of said terminals, a spring contact strip electrically connected to said first and second contact strips in the initial position of said block, a vane, means actuable by air pressure on said vane adapted by initial movement to bodily move said block to contact said first strip with its coacting terminal and by a subsequent movement to move said second strip away from contact with said spring contact strip, said spring contact strip maintaining its engagement with said second strip over a predetermined range of movement, the reverse movement of said vane effecting a reversal of the operation of all of said strips, and electrical connections between the signal and switch mechanism to operate the signal when both contact strips are closed.

MACY O. TEETOR.